United States Patent [19]

Ishida

[11] Patent Number: 5,095,405

[45] Date of Patent: Mar. 10, 1992

[54] CONNECTOR DEVICE HAVING LARGE NUMBER OF CONNECTING TERMINALS ARRANGED ON ARCUATELY GUIDED CONNECTORS

[75] Inventor: Tetsuroh Ishida, Tokyo, Japan

[73] Assignee: Kabushiki Kaisha Toshiba, Kawasaki, Japan

[21] Appl. No.: 620,545

[22] Filed: Nov. 29, 1990

[30] Foreign Application Priority Data

Nov. 30, 1989 [JP] Japan .................. 1-311393

[51] Int. Cl.⁵ .................. H05K 7/10; H01R 13/629; G06F 1/00
[52] U.S. Cl. .................. 361/393; 439/326; 439/376; 361/394; 364/708
[58] Field of Search .................. 439/326, 341, 376; 361/380, 392, 393, 394, 395, 399; 364/708

[56] References Cited

U.S. PATENT DOCUMENTS

| 3,970,351 | 7/1976 | Hollingsead et al. ........ 439/310 X |
| 4,553,192 | 11/1985 | Babuka et al. ........ 361/395 |
| 4,669,053 | 5/1987 | Krenz ........ 364/708 |
| 4,747,790 | 5/1988 | Masuda et al. ........ 439/326 X |
| 4,790,761 | 12/1988 | Sonobe ........ 439/326 X |
| 4,850,891 | 7/1989 | Walkup et al. ........ 439/326 |
| 4,903,222 | 2/1990 | Carter et al. . | |

FOREIGN PATENT DOCUMENTS

| 119951 | 9/1984 | European Pat. Off. ........ 439/341 |
| 0214762 | 3/1987 | European Pat. Off. . | |

Primary Examiner—Leo P. Picard
Assistant Examiner—Michael W. Phillips
Attorney, Agent, or Firm—Cushman, Darby & Cushman

[57] ABSTRACT

A connector device includes a first connector having a large number of first connecting terminal, and a second connector having a large number of second connecting terminals to be brought into contact with the first connecting terminals. The first connector has a contact portion which is brought into contact with the second connector when the first connector is obliquely inserted in the second connector. The first connector is pivoted on the contact portion to be brought into contact with the second connector. The first connector has a first fitting portion and an arcuated first guide portion. The second connector has a second fitting portion which is detachably fitted in the first fitting portion when the first connector is pivoted toward the second connector, and an arcuated second guide portion which is engaged with the first guide portion to guide pivoting of the first connector. The first connecting terminals slidably overlap the second connecting terminals so as to be electrically connected thereto when the first connector is pivoted toward the second connector.

12 Claims, 17 Drawing Sheets

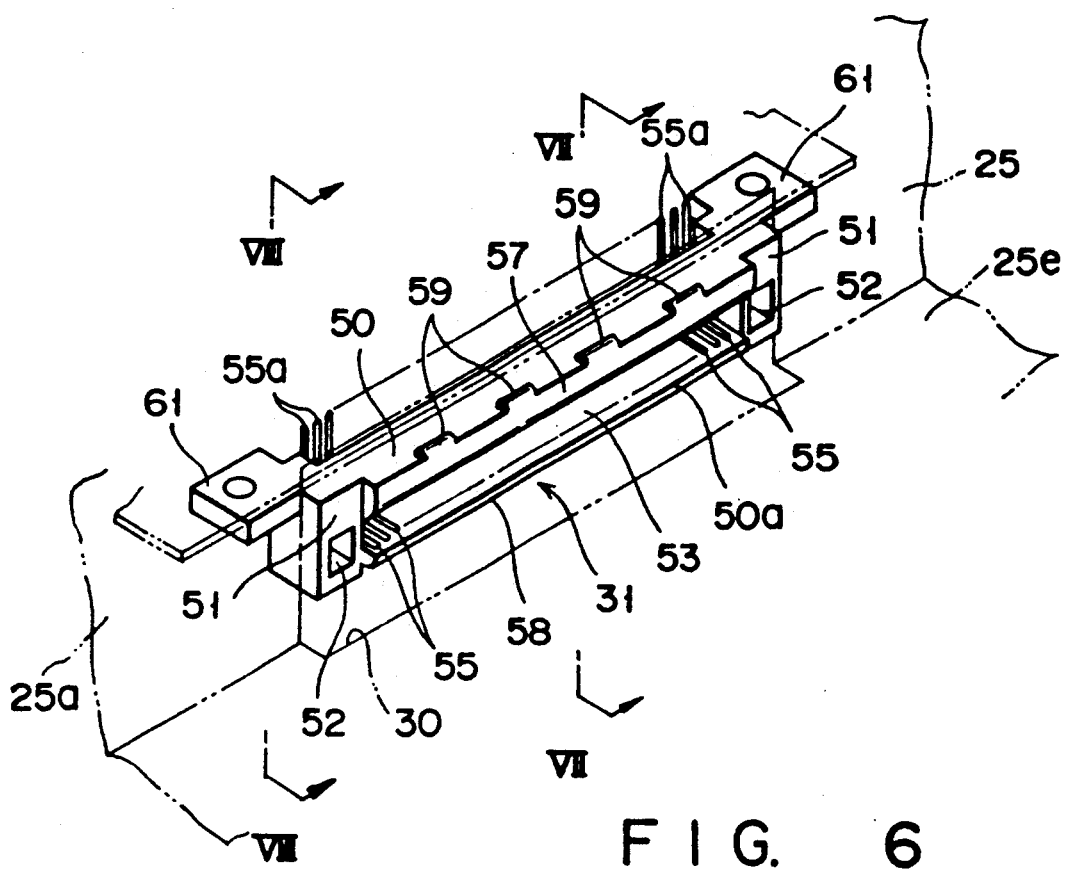
FIG. 6
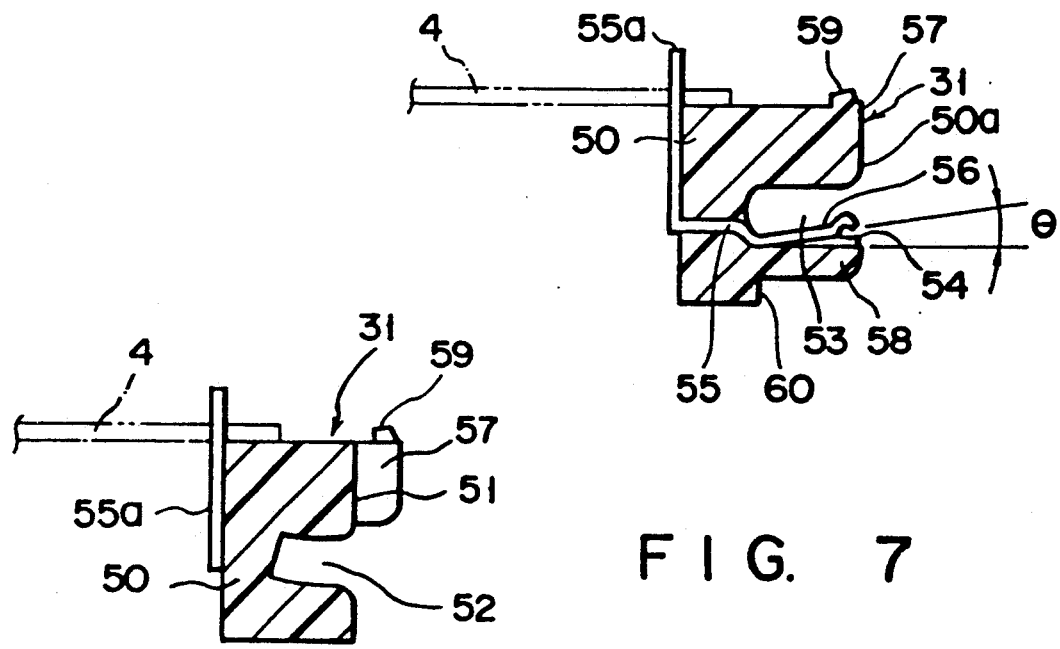
FIG. 7
FIG. 8

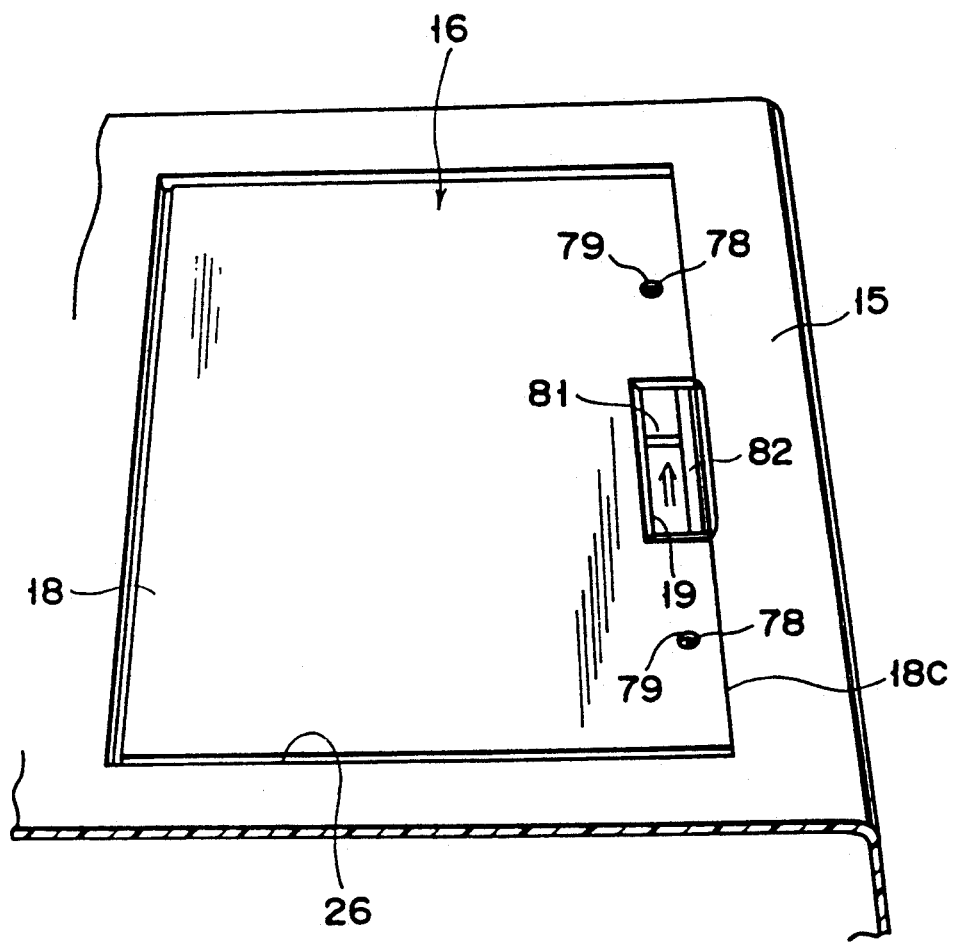
F I G. 20

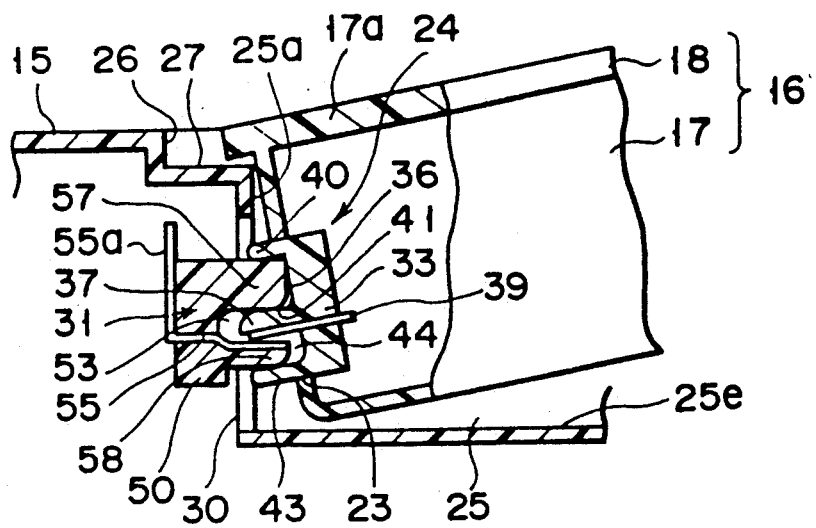
F I G. 22
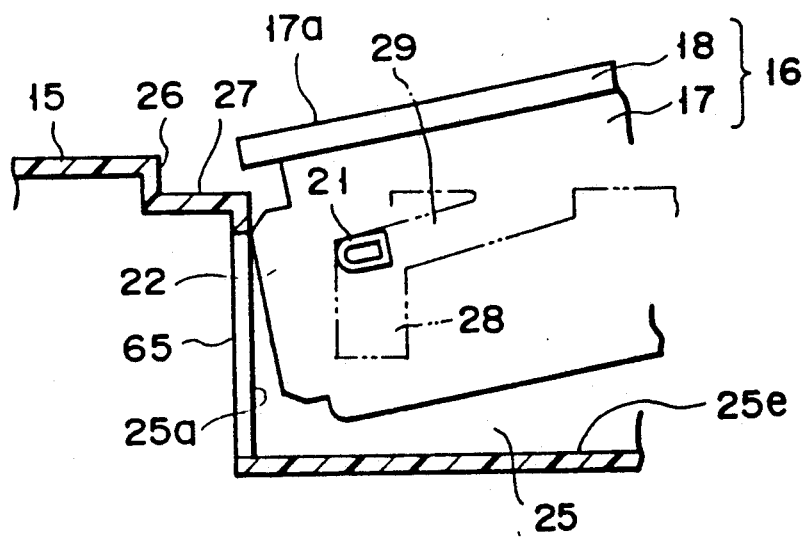
F I G. 23

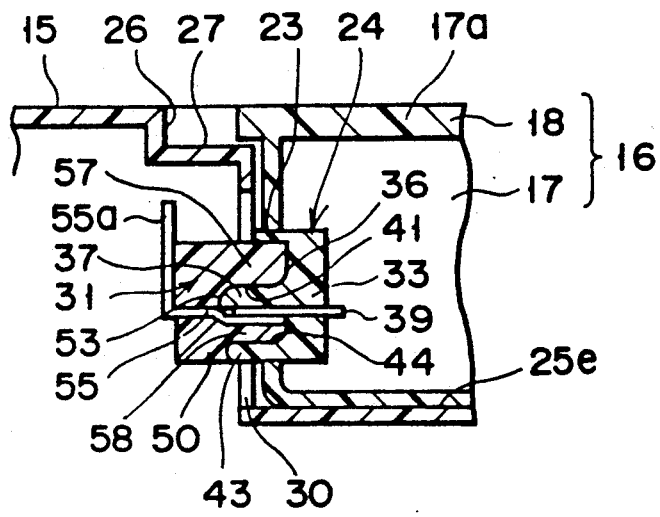
F I G. 27
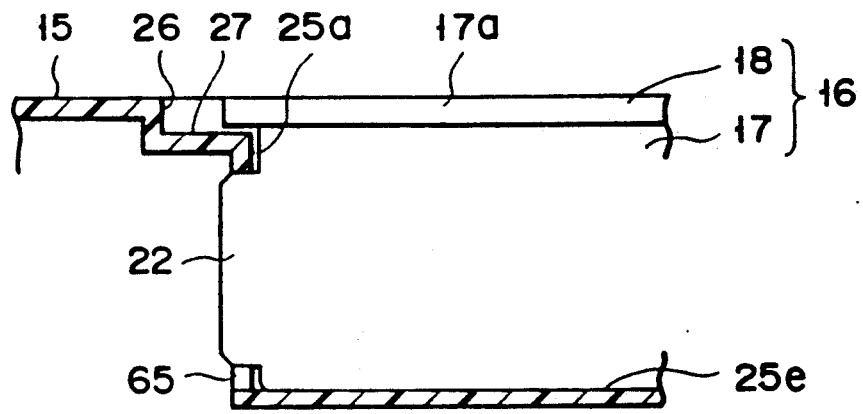
F I G. 28

CONNECTOR DEVICE HAVING LARGE NUMBER OF CONNECTING TERMINALS ARRANGED ON ARCUATELY GUIDED CONNECTORS

BACKGROUND OF THE INVENTION

1. Field of the Invention

The present invention relates to a connector device constituted by a first connector having a large number of first connecting terminals, and a second connector having a large number of second connecting terminals to be connected to the first connecting terminals and used for a portable apparatus such as a lap-top type or portable type computer and, more particularly, to a structure for connecting first and second connectors to each other by obliquely inserting the first connector in the second connector and subsequently pivoting the first connector.

2. Description of the Related Art

In recent years, a lap-top type, portable computer having a keyboard and a flat panel type display unit attached to a box-like base unit has been widely used.

In such a portable computer, an HDD or FDD is mounted in a base unit, as disclosed in U.S. Pat. No. 4,903,222. In a portable computer of this type, an auxiliary HDD formed into a unit as one module is detachably mounted in a base unit to process a large amount of data. This HDD includes a box-like flat case having a first connector. In this case, a driving unit for rotating a hard disk, and a head for writing and reading data in and from the hard disk are housed. The head and the driving unit are electrically connected to the first connector.

The base unit includes a receiving portion for mounting the HDD. The receiving portion is open to the rear surface of a rear portion of the base unit, and a second connector is arranged in this opening. The second connector is electrically connected to electronic equipments mounted in the base unit. When the HDD is inserted in the opening of this base unit, the two connectors are connected to each other. Upon this connection, the HDD is electrically connected to the base unit to allow write and read operations of data.

The first and second connectors respectively have connector bodies for supporting the connecting terminals. The connector bodies of the first and second connectors have surfaces which are caused to abut straight against each other when the HDD is inserted in the opening of the base unit. The connecting terminals are exposed on the abutment surfaces of these connectors. The connecting terminals are brought into contact with each other when the connector bodies are caused to abut against each other. As a result, the connecting terminals of the first and second connectors are electrically connected to each other. An engaging projection extends from the abutment surface of one connector body. A guide recess is formed in the abutment surface of the other connector body. The guide recess is engaged with the engaging projection to guide abutment of the connector bodies. Upon engaging of the projection with the guide recess, the first and second connectors are mechanically coupled to each other, thus maintaining a connecting state of the connecting terminals.

These conventional connectors are designed to be disconnected from each other by pulling the connector bodies in a direction perpendicular to the abutment surfaces. For this reason, in order to prevent disconnection of the connectors caused when an external force is accidentally applied to the connectors to disconnect the connector bodies, the engaging projection and the guide recess of the connector bodies of the conventional connectors are firmly engaged with each other.

If, however, the engaging projection and the guide recess are firmly engaged with each other, a large resistance is generated not only when the first and second connectors are connected to each other but also when they are disconnected from each other.

SUMMARY OF THE INVENTION

It is an object of the present invention to provide a connector device in which only a small resistance is generated upon connection and disconnection of first and second connectors, and connection and disconnection of the connectors can be smoothly performed.

According to the present invention, there is provided a connector device comprising:
- a first connector having a large number of first connecting terminal; and
- a second connector having a large number of second connecting terminals to be brought into contact with the first connecting terminals of the first connector,
- the first connector having a contact portion which is brought into contact with the second connector when the first connector is obliquely inserted in the second connector, the first connector being pivoted on the contact portion to be brought into contact with the second connector, and the first connector having a first fitting portion and an arcuated first guide portion on a surface thereof opposite to the second connector,
- the second connector having a second fitting portion which is detachably fitted in the first fitting portion when the first connector is pivoted toward the second connector, and an arcuated second guide portion which is engaged with the first guide portion to guide pivoting of the first connector, and
- the first connecting terminals of the first connector slidably overlapping the second connecting terminals of the second connector so as to be electrically connected thereto when the first connector is pivoted toward the second connector.

According to the connector device of the present invention, when the first connector is pivoted on the contact portion which is brought into contact with the second connector, the abutment surfaces of the two connectors are brought into contact with each other. In this contact state, the first and second fitting portions are fitted with each other. At the same time, the arcuated first and second guide portions are engaged with each other. With this arrangement, even if an external force is applied to both the first and second connectors in a connecting state so as to disconnect them from each other in a straight direction, since the engaged guide portions are curved in an arcuated shape, the engagement of these guide portions is not released. Therefore, the guide portions serve as stops for preventing disconnection of the fitting portions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 6 is a perspective view showing a second connector attached to the receiving portion of the base unit in FIG. 2;

FIG. 7 is a sectional view taken along a line VII—VII in FIG. 6;

FIG. 8 is a sectional view taken along a line VIII—VIII in FIG. 6;

FIG. 20 is a perspective view showing a state wherein the storage unit is mounted in the receiving portion of the base unit in FIG. 2;

FIG. 22 is a sectional view showing a state wherein the connecting terminals of the connectors in FIG. 21 are brought into contact with each other upon insertion of the storage unit;

FIG. 23 is a sectional view showing a state wherein the case of the storage unit and the receiving portion of the base unit in FIG. 21 are engaged with each other upon insertion of the storage unit;

FIG. 27 is a sectional view showing a state wherein the connectors in FIG. 26 are connected to each other, and their connecting terminals are brought into contact with each other; and FIG. 28 is a sectional view showing a state wherein the case of the storage unit and the receiving portion are completely engaged with each other while the storage unit in FIG. 24 is housed in the receiving portion of the base unit.

DETAILED DESCRIPTION OF THE PREFERRED EMBODIMENTS

Figure 1:
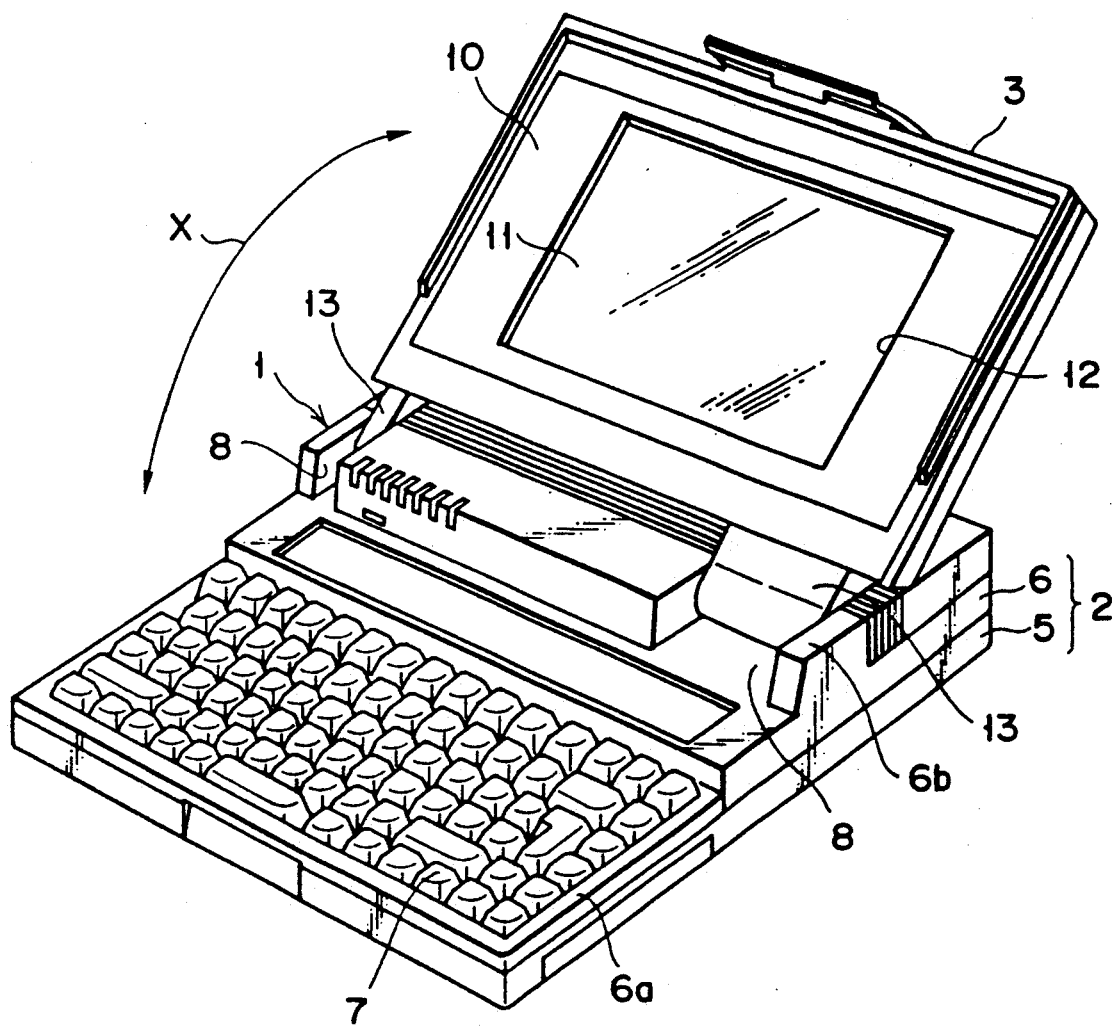
FIG. 1 is a perspective view showing a portable computer according to the present invention.

FIG. 1 shows a lap-top type portable computer 1. The portable computer 1 includes a base unit 2 and a flat panel type display unit 3. The base unit 2 is formed into a thin box having a rectangular shape. A floppy-disk drive device (FDD) is housed in the base unit 2.

The base unit 2 includes a bottom case 5 in which a printed circuit board 4 is housed, and a top cover 6 for covering the bottom case 5. The top cover 6 consists of front portion 6a and rear portion 6b. A keyboard 7 is attached to the front portion 6a of the top cover 6. The rear portion 6b of the top cover 6 protrudes upward from the keyboard 7. A pair of mounting recesses 8 are formed at the front end of the rear portion 6b of the top cover 6.

The display unit 3 includes a rectangular housing 10 and a flat display 11 housed in this housing 10. The display 11 is externally exposed through an opening 12 in the front surface of the housing 10. The housing 10 of the display unit 3 has a pair of leg portions 13 to be respectively inserted in the mounting recesses 8 of the top cover 6. The leg portions 13 are pivotally coupled to the mounting recesses 8 of the top cover 6 by means of hinges (not shown), respectively. With this coupling, the display unit 3 is rotated between a closed position where the keyboard 7 is covered and an upright position where the keyboard 7 and the display 11 are exposed during an operation of the keyboard 7, as indicated by an arrow X in FIG. 1.

Figure 2:
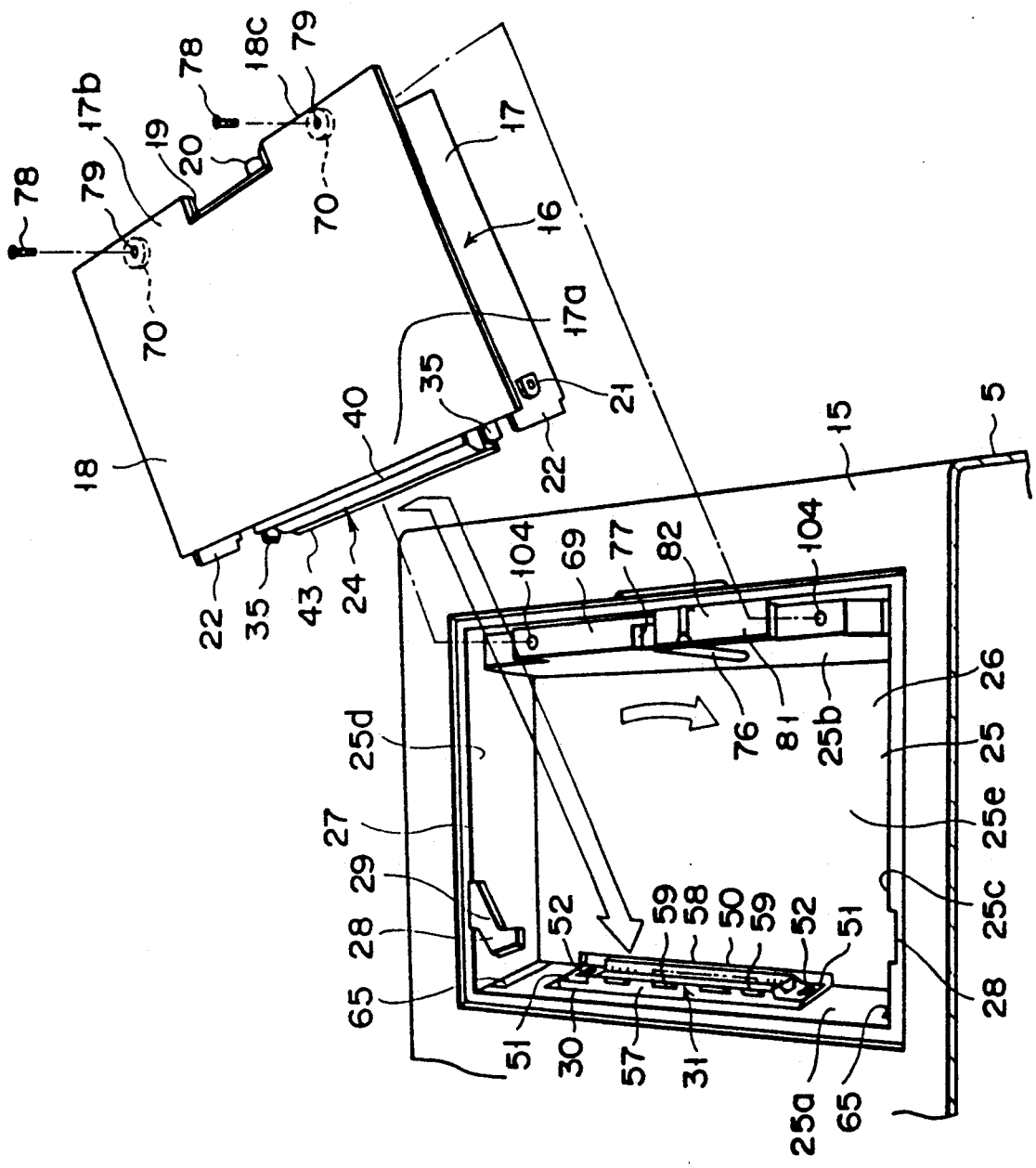
FIG. 2 is an exploded perspective view showing a state wherein a storage unit is mounted in a base unit of the portable computer in FIG. 1.

As shown in FIG. 2, the bottom case 5 of the base unit 2 has a flat bottom plate 15. A hard-disk drive device (HDD) 16 is detachably mounted in a rear portion of the bottom plate 15. A structure for mounting this HDD 16 will be described below.

As shown in FIG. 2, the HDD 16 has a case 17 having a flat, rectangular box-like shape. The case 17 includes front portion 17a and rear portion 17b. A driving unit for driving the hard disk and a head unit are housed in the case 17. The head unit is used to write and read data in and from the hard disk. A cover plate 18 of the case 17 has a flat, rectangular plate-like shape. The four peripheral edge portions of the cover plate 18 extend outward from the side surfaces of the case 17. Of the peripheral edge portions of the cover plate 18, a peripheral edge portion 18c corresponding to the rear portion 17b of the case 17 has a notch 19 formed therein. A columnar engaging projection 20 is formed on the rear surface of the rear portion 17b of the case 17. This engaging projection 20 extends backward from the case 17. Guide projections 21 respectively extend from the right and left side surfaces of the front portion 17a of the case 17. Hook pieces 22 respectively extend from the front ends of the right and left side surfaces of the case 17. The hook pieces 22 extend forward from the front surface of the front portion 17a of the case 17 and from the cover plate 18.

Figure 3:
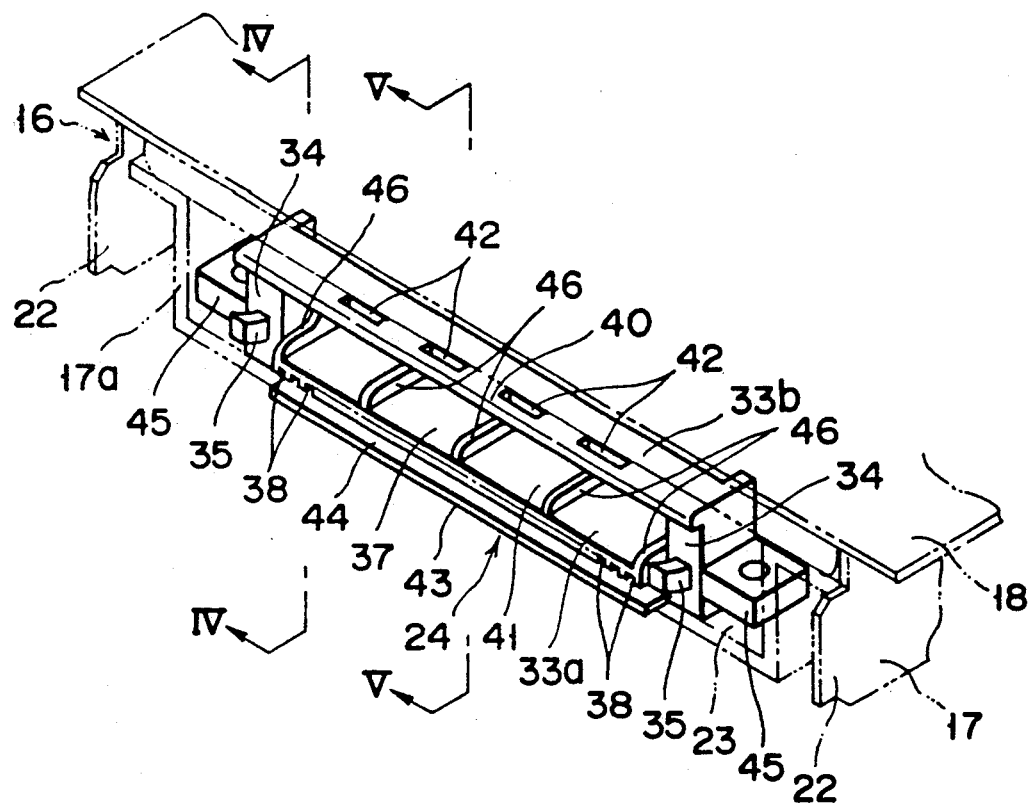
FIG. 3 is a perspective view showing a first connector attached to a case of the storage unit in FIG. 2.

As shown in FIG. 3, a connector mounting port 23 is formed in the front surface of the front portion 17a of the case 17 so as to extend in a lateral direction. A first connector 24 is mounted in the connector mounting port 23. The first connector 24 is electrically connected to the driving unit and the head unit in the case 17.

A receiving portion 25 for detachably mounting the HDD 16 is formed in the bottom plate 15 of the bottom case 5. The receiving portion 25 is set back from the bottom case 5. The recess 25 has a size to allow the case 17 to be fitted therein. The recess 25 is located below the rear portion 6b of the top cover 6 and constitutes an insertion opening 26 in the bottom plate 15 of the bottom case 5 so as to allow the HDD 16 to be inserted therein. A fitting portion 27 is formed in the edge defining the insertion opening 26. The edge of the cover plate 18 of the case 17 is to be fitted in the fitting portion 27. When the edge of the cover plate 18 is fitted in the fitting portion 27, the cover plate 18 of the case 17 becomes continuous with the bottom plate 15 of the bottom case 5 so that the cover plate 18 of the case 17 serves as a portion of the bottom plate 15 of the bottom case 5.

The recess 25 of the bottom case 5 includes a front surface 25a, a rear surface 25b, a pair of right and left side surfaces 25c and 25d, and a bottom surface 25e. Guide grooves 28 in which the guide projections 21 of the case 17 are inserted are formed in the right and left side surfaces 25c and 25d of the recess 25. Each guide groove 28 extends upward to the insertion opening 26 in the vertical direction. One end of each guide groove 28 is located near the bottom surface 25e of the recess 25, and the other end of each guide groove 28 is open to the fitting portion 27. Each guide groove 28 has an inclined portion 29 between the two ends. The inclined portion 29 of each guide groove 28 is gradually inclined to the rear portion of the recess 25 as it approaches the insertion opening 26 of the recess 25. The inclination angle of each inclined portion 29 is set to guide the front portion 17a of the case 17 of the HDD 16 toward the front surface 25a of the recess 25. When the guide projections 21 of the case 17 are respectively inserted in the guide grooves 28, the insertion direction of each guide projection 21 is guided by a corresponding one of the inclined portions 29. For this reason, the HDD 16 is inserted in the recess 25 of the base unit 2 in an inclined posture with respect to the recess 25.

A laterally extending connector mounting port 30 is formed in the front surface 25a of the recess 25. A second connector 31 is mounted in the connector mounting port 30. The second connector 31 is electrically connected to the printed circuit board 4 in the bottom case 5. When the HDD 16 is inserted in the recess 25, the second connector 31 is electrically connected to the first connector 24 of the HDD 16.

Figure 4:
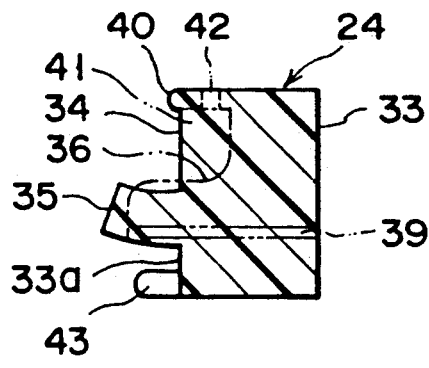
FIG. 4 is a sectional view taken along a line IV—IV in FIG. 3.
Figure 5:
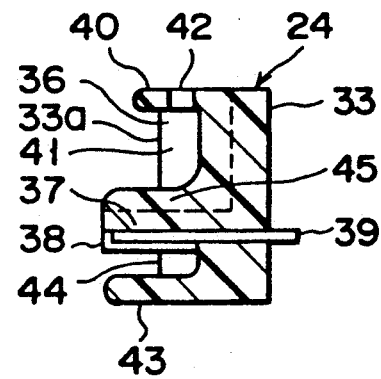
FIG. 5 is a sectional view taken along a line V—V in FIG. 3.
Figure 9:
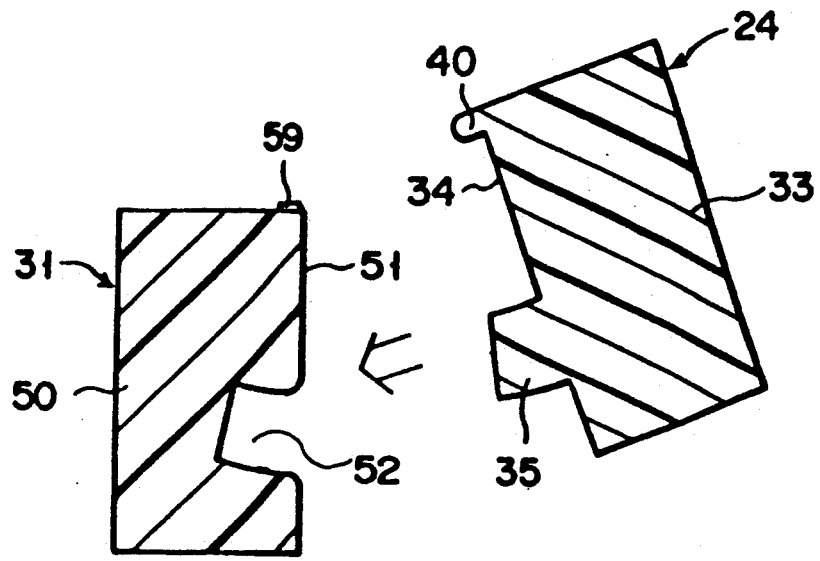
FIG. 9 is a sectional view showing a state wherein the connectors respectively shown in FIGS. 3 and 6 oppose each other when the storage unit is mounted.

Arrangements of these connectors 24 and 31 will be described below. As shown in FIGS. 3 to 5, the first connector 24 of the HDD 16 includes an elongated connector body 33 consisting of a synthetic resin. The connector body 33 has a front surface 33a exposed to the connector mounting port 23. The front surface 33a of the connector body 33 laterally extends along the connector mounting port 23. Flat abutment portions 34 are respectively formed on the right and left end portions of the front surface 33a of the connector body 33. The abutment surfaces 34 are parallel to the front surface 25a of the recess 25. Fist guide projections 35 respectively extend from the abutment surfaces 34. As shown in FIG. 4, the first guide projections 35 are constituted by projections protruding from the abutment surfaces 34. The guide projections 35 are gradually curved toward the cover plate 18 of the case 17 as they extend from the abutment surfaces 34. The front surface 33a of the connector body 33 is set back between the abutment surfaces 34 so as to form a recess 36. A terminal support wall 37 is formed at an extreme end of the recess 36 so as to extend to the abutment surfaces 34. The terminal support wall 37 extends forward from the abutment surfaces 34. A plurality of reinforcing ribs 46 are formed on the upper surface of the terminal support wall 37. A large number of grooves 38 extending in the front/rear directions of the terminal support wall 37 are arranged in a row on the lower surface of the terminal support wall 37. Pin type first connecting terminals 39 are respectively arranged in the grooves 38. The first connecting terminals 39 are guided into the case 17 through the rear wall of the connector body 33, and the distal ends of these first connecting terminals 39 are electrically connected to the driving unit of the hard disk and the head unit described above. A guide wall 40 is formed on the upper edge of the front surface 33a of the connector body 33. The guide wall 40 serves as a fulcrum when the first connector 24 and second connector 31 are to be connected to each other. The guide wall 40 extends over the connector body 33 and protrudes forward from the abutment surfaces 34 of the connector body 33. A first fitting groove 41 is formed between the guide wall 40 and the terminal support wall 37. Four engaging holes 42 are laterally arranged at certain intervals on an upper surface 33b of the connector body 33. The fitting holes 42 are open to the first engaging groove 41. A fitting wall 43 parallel to the guide wall 40 is formed on the lower edge of the front surface 33a of the connector body 33. The fitting wall 43 extends between the abutment surfaces 34 and protrudes forward from the abutment surfaces 34. A second fitting groove 44 is formed between the fitting wall 43 and the terminal support wall 37. The first connecting terminals 39 are exposed in the fitting groove 44. Tongues 45 are respectively formed on the light and left side portions of the connector body 33. The tongues 45 are fastened to the cover plate 18 of the case 17 in the connector mounting port 23 of the case 17 with screws. With this arrangement, the first connector 24 is fixed to the case 17 while the abutment surfaces 34, the guide projections 35, the terminal support wall 37, the guide wall 40, and the fitting wall 43 of the connector body 33 protrude from the connector mounting port 23 of the case 17.

As shown in FIGS. 6 to 8, the second connector 31 of the base unit 2 includes a connector body 50 consisting of a synthetic resin. The connector body 50 has a front surface 50a exposed to the connector mounting port 30 of the recess 25. The front surface 50a of the connector body 50 laterally extends along the connector mounting port 30. Flat abutment surfaces 51 are formed at the right and left end portions of the front surface 50a of the connector body 50. The abutment surfaces 51 are parallel to the front surface 25a of the recess 25. When the HDD 16 is inserted in the recess 25, the abutment surfaces 51 of the connector body 50 are caused to oppose the abutment surfaces 34 of the first connector 24. Second guide portions 52 which are engaged with the guide projections 35 are respectively formed in the abutment surfaces 51 of the connector body 50. As shown in FIG. 8, the second guide portions 52 are constituted by engaging hole in which the guide projections 35 are inserted. As shown in FIG. 8, each engaging hole 52 is gradually curved toward a deep portion so as to fit the arcuated shape of a corresponding one of the guide projections 35. A fitting recess 53 in which the terminal support wall 37 of the first connector 24 is detachably fitted is formed in the front surface 50a of the connector body 50. The fitting recess 53 extends between the abutment surfaces 51. A large number of grooves 54 extending in the front/rear direction of the fitting recess 53 are aligned on the lower surface of the fitting recess 53. A large number of pin type second connecting terminals 55 are arranged in the respective grooves 54. The second connecting terminals 55 protrude into the bottom case 5 of the base unit 2 through the rear wall of the connector body 50. Protruding portions 55a of the second connecting terminals 55 are vertically bent to extend along the rear wall of the connector body 50. The distal end of each protruding portion 55a is electrically connected to the printed circuit board 4. As shown in FIG. 7, a portion of each second connecting terminal 55 which is located inside the fitting recess 53 is bent upward to constitute a movable contact piece 56. A bending angle $\theta$ of the movable contact piece 56 is set to coincide with the insertion angle of the HDD 16 into the recess 25. First and second fitting projections 57 and 58 are formed on the front surface 50a of the connector body 50. The first and second fitting projections 57 and 58 are detachably fitted in the first and second fitting grooves 41 and 44, respectively. These fitting projections 57 and 58 respectively extend between the abutment surfaces 51 at the upper and lower sides of the fitting recess 53 and extend forward therefrom. A corner portion of the first fitting projection 57 located on the upper side of the fitting recess 53 which opposes the fitting recess 53 is curved in an arcuated shape to be smoothly fitted in the first fitting groove 41. Four positioning projections 59 extend from the upper edge of the first fitting projection 57 at certain intervals in the lateral direction of the connector body 50. When the HDD 16 is inserted in the recess 25, the positioning projections 59 are respectively fitted in the fitting holes 42 of the first connector 24, thus positioning the two connectors 24 and 31 in the lateral direction. A recess 60 in which the fitting wall 43 of the first connector 24 is slid is formed in the lower surface of the connector body 50. Tongues 61 are respectively formed on the right and left side portions of the connector body 50. The tongues 61 are located inside the connector mounting port 30 of the bottom case 5 and are fastened to the printed circuit board 4 of the bottom case 5 with screws. With this arrangement, the second connector 31 is fixed to the bottom case 5 while the abutment surfaces 51, the fitting projections 57 and 58, and the positioning projections 59 of the connector body 50 protrude from the connector mounting port 30 of the bottom case 5.

Figure 10:
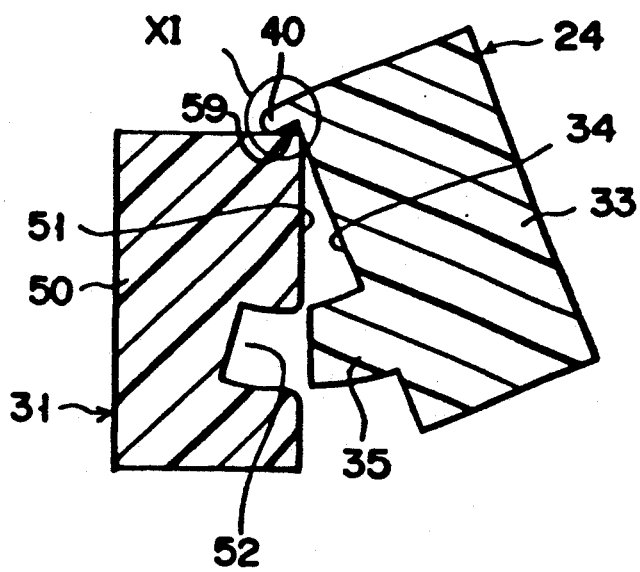
FIG. 10 is a sectional view showing a state wherein the connectors in FIG. 9 are brought into contact with each other upon mounting of the storage unit.
Figure 11:
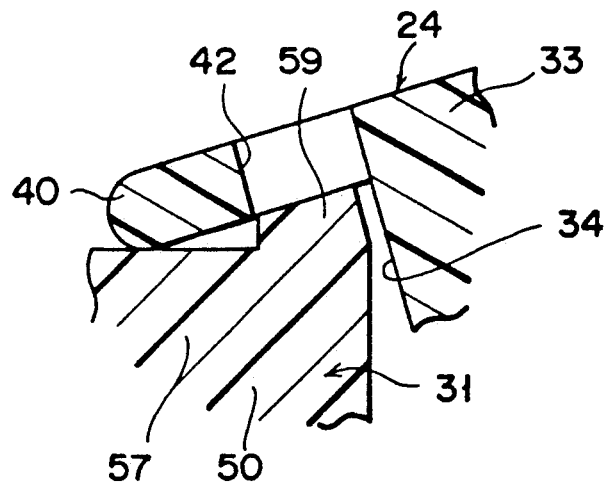
FIG. 11 is an enlarged sectional view of a portion XI in FIG. 10.
Figure 12:
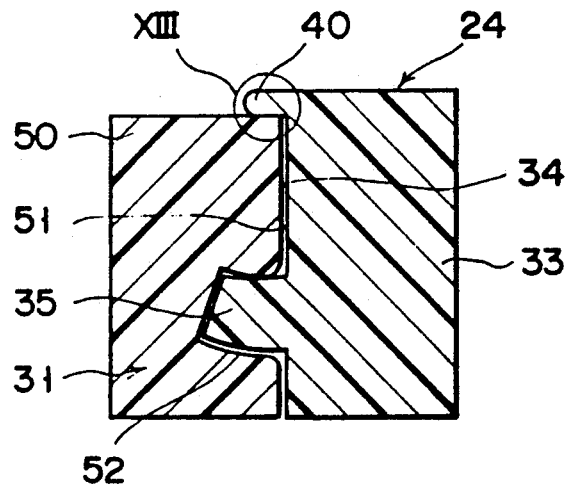
FIG. 12 is a sectional view showing a state wherein the connectors in FIG. 10 are brought into contact with each other upon mounting of the storage unit.
Figure 13:
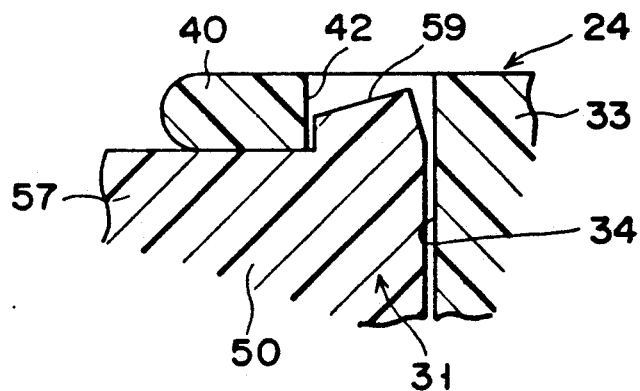
FIG. 13 is an enlarged sectional view showing a portion XIII in FIG. 12.

In this arrangement, as shown in FIGS. 10 and 11, when the HDD 16 is obliquely inserted into the recess 25 along the inclined portions 29 of the guide grooves 28, the guide wall 40 of the first connector 24 is brought into contact with the upper surface of the first fitting projection 57 of the second connector 31. Upon this contact, the fitting holes 42 of the guide wall 40 are respectively fitted on the positioning projections 59 of the first fitting projection 57, thus positioning the first and second connectors 24 and 31 in the lateral direction. When the HDD 16 is pushed into the recess 25 in such a manner that the case 17 of the HDD 16 becomes parallel to the bottom plate 15 of the bottom case 5, the HDD 16 pivots on a contact portion between the first and second connectors 24 and 31. Upon this pivoting of the HDD 16, the guide projections 35 of the first connector 24 are respectively inserted in the engaging holes 52 of the second connector 31, and the fitting projections 57 and 58 of the second connector 31 are respectively inserted in the fitting grooves 41 and 44 of the first connector 24. In addition, the positioning projections 59 of the second connector 31 are respectively inserted in the fitting holes 42 of the first connector 24. As a result, the abutment surfaces 34 and 51 of the two connectors 24 and 31 are brought into contact with each other, and hence the connectors 24 and 31 are coupled to each other.

As shown in FIG. 22, while the guide wall 40 of the first connector 24 is in contact with the upper surface of the first fitting projection 57 of the second connector 31, the first connecting terminals 39 of the first connector 24 are respectively in contact with the movable contact pieces 56 of the second connecting terminals 55 of the second connector 31 from the above. These connecting terminals 39 and 55 are brought into slidable contact with each other upon pivoting of the HDD 16. When the connectors 24 and 31 are coupled to each other upon pivoting of the HDD 16, the connecting terminals 39 and 55 are clamped between the terminal support wall 37 of the connector body 33 and the second fitting projection 58 of the connector body 50, as shown in FIG. 27. As a result, the connecting terminals 39 and 55 are vertically stacked on each other to be electrically connected to each other.

As shown in FIG. 2, lock ports 65 in which the hook pieces 22 of the case 17 of the HDD 16 are respectively inserted are formed in the front surface 25a of the recess 25. The lock ports 65 are located on the right and left sides of the second connector 31. As shown in FIG. 23, when the HDD 16 is inserted in the recess 25, the lock ports 65 oppose the hook pieces 22 of the HDD 16, and an upper end corner portion of each hook piece 22 is brought into contact with an opening edge of a corresponding one of the lock ports piece 65. The hook pieces 22 enter the lock ports 65 upon pivoting of the HDD 16. As shown in FIG. 28, when the HDD 16 is completely inserted into the recess 25, the hook pieces 22 are hooked to the lock ports 65.

Figure 14:
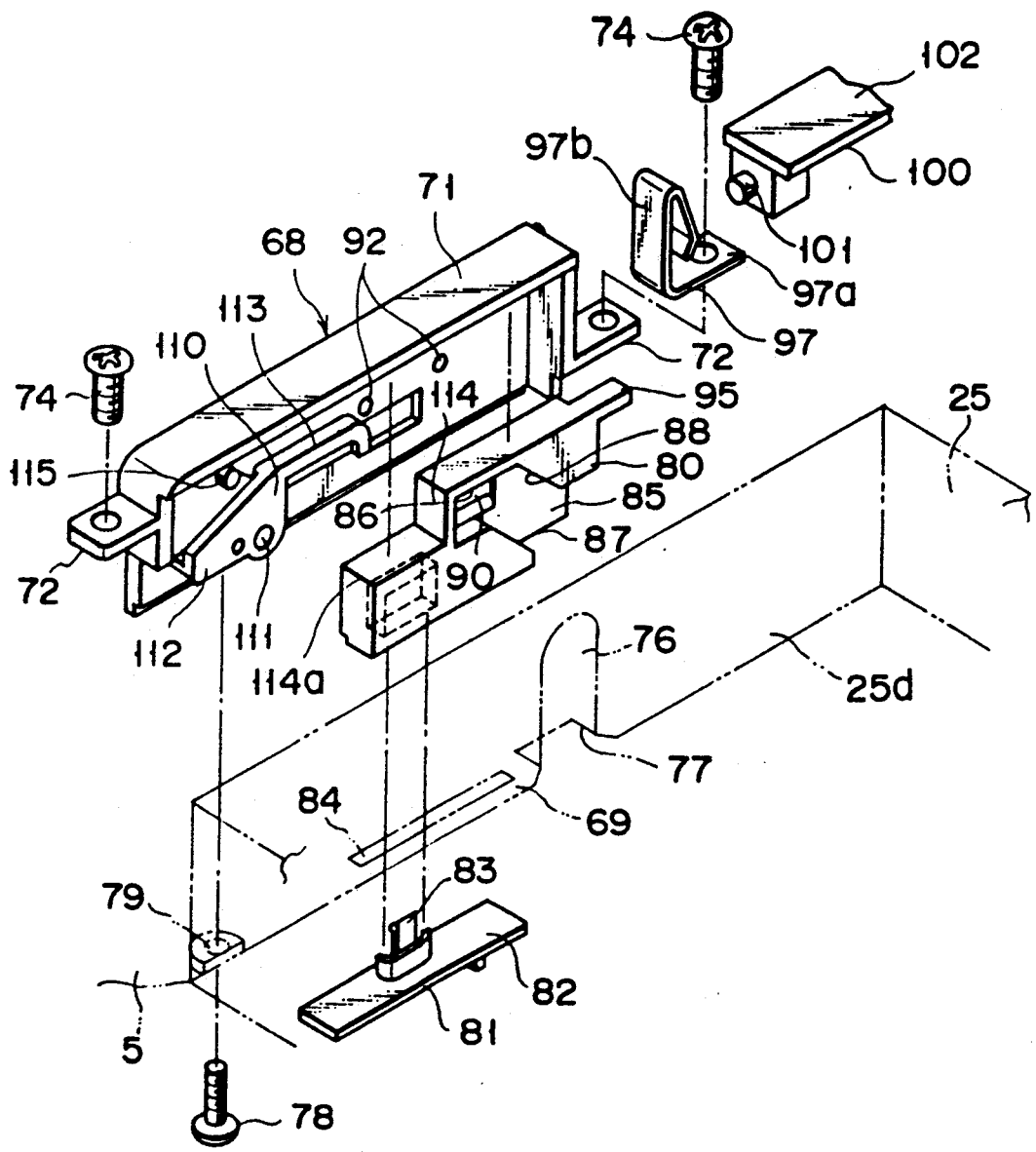
FIG. 14 is an exploded perspective view showing a lock mechanism for confining the storage unit within a receiving portion of the base unit.
Figure 18:
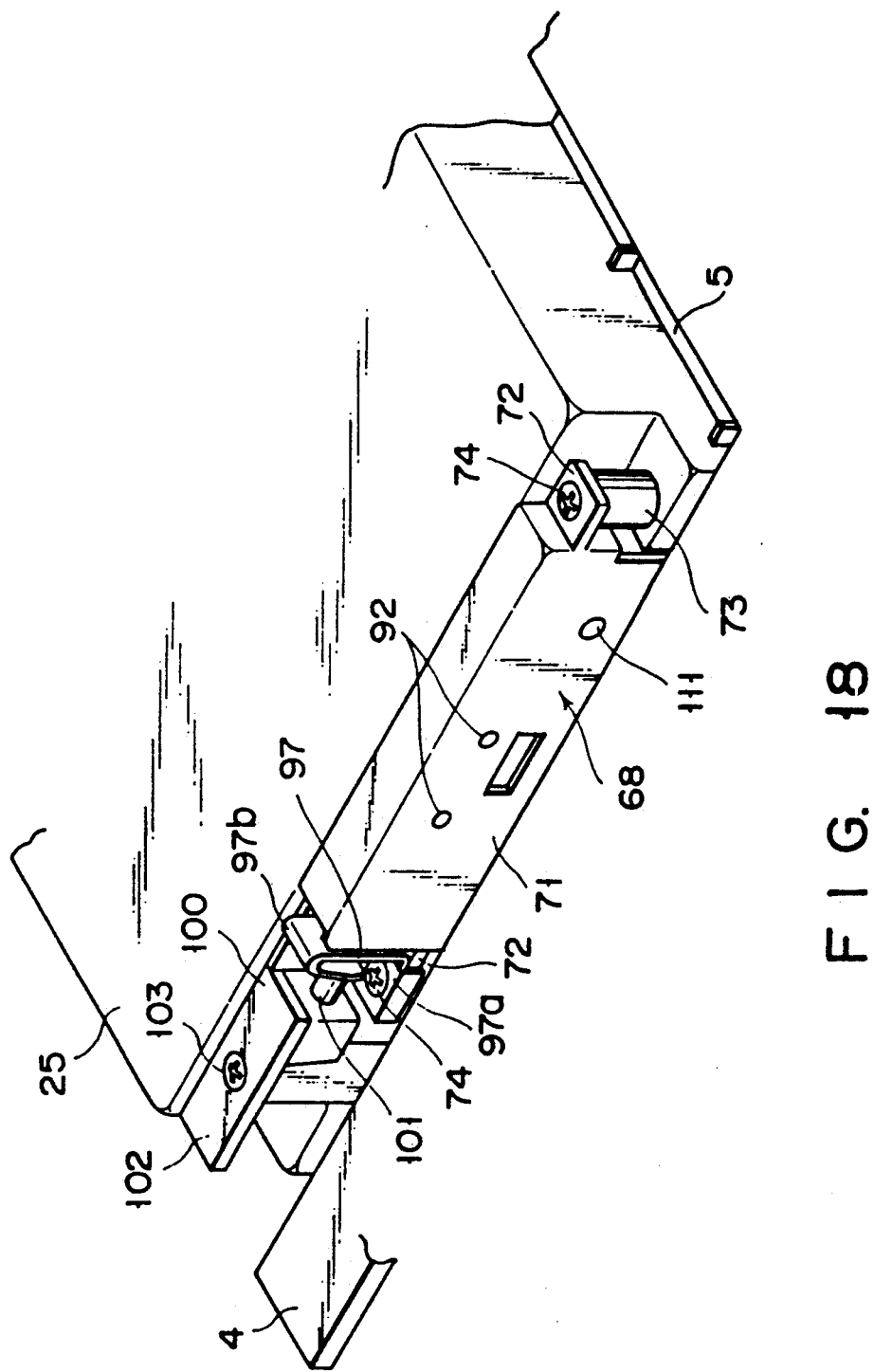
FIG. 18 is a perspective view showing a state wherein the lock mechanism in FIG. 14 is attached to the base unit.
Figure 19:
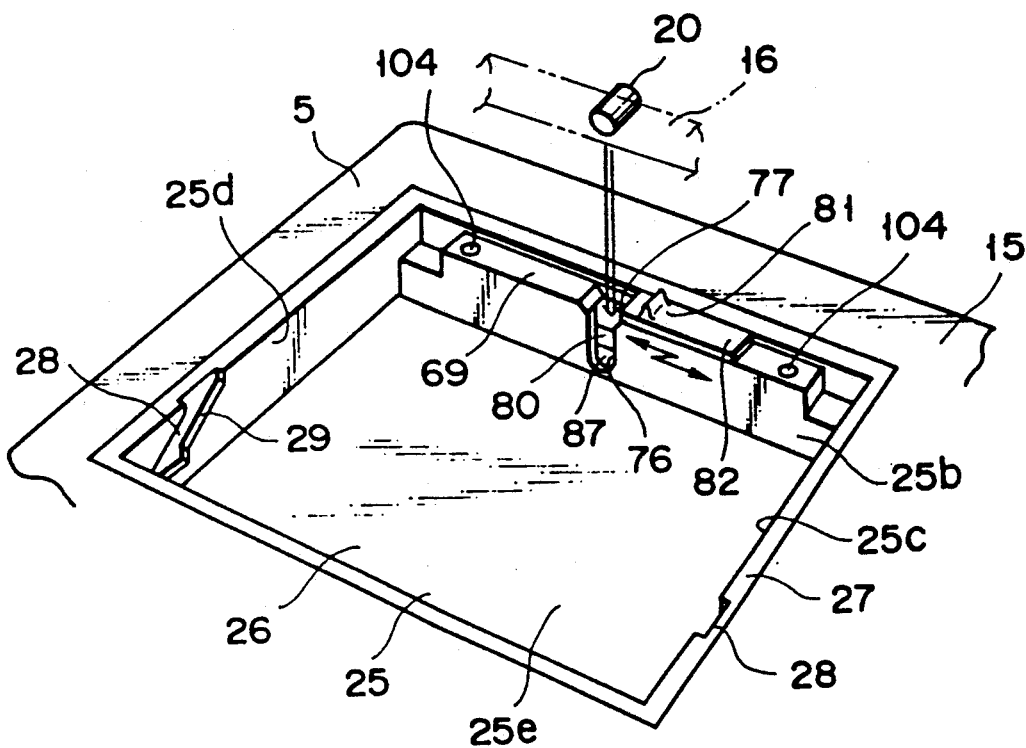
FIG. 19 is a perspective view showing the receiving portion of the base unit to which the storage unit in FIG. 2 is attached.

A lock mechanism 68 for confining the HDD 16 in the recess 25 is arranged on the rear surface 25b of the recess 25. The lock mechanism 68 will be described below with reference to FIGS. 2 to 9. The rear surface 25b of the recess 25 protrudes into the recess 25. A support wall 69 is formed on an end portion of the rear surface 25b of the recess 25 on the side of the insertion opening 26 so as to oppose the rear edge portion 18c of the cover plate 18 of the HDD 16. A pair of seat portions 70 of the rear edge portion 18c of the cover plate 18 are supported by the support wall 69. The seat portions 70 respectively have through holes 79 in which screws 78 for fixing the HDD 16 to the recess 25 are inserted. As shown in FIGS. 14 or 18, a cover 71 for covering the rear surface 25b of the recess 25 is mounted in the bottom case 5. The cover 71 has an elongate shape extending in the lateral direction of the recess 25. The cover 71 has mounting tongues 72 on its two end portions. These tongues 72 are fixed to bosses 73 on the inner surface of the bottom case 5 with screws 74. A lock chamber 75 is formed between the cover 71 and the rear surface 25b of the recess 25. An insertion port 76 in which the engaging projection 20 of the case 17 is inserted is formed in the rear surface 25b of the recess 25. The insertion port 76 has a groove-like shape vertically extending in the rear surface 25b of the recess 25. The recess 25 and the lock chamber 75 communicate with each other through this insertion port 76. An opening 77 is formed in the support wall 69 in the recess 25 so as to guide the engaging projection 20 of the case 17 into the insertion port 76.

As shown in FIGS. 14 to 17, a slider 80 is housed in the lock chamber 75. The slider 80 is made of a synthetic resin. The slider 80 is sandwiched between the cover 71 and the rear surface 25b and the support wall 69 of the recess 25 so as to be slidable in the lateral direction of the recess 25. An operation knob 81 is attached to the slider 80 and is used to operate it. The operation knob 81 comprises a slide plate 82 located on the support wall 69, and a pawl 83 for coupling the slide plate 82 to the slider 80. The pawl 83 is hooked to the slider 80 through an elongated hole 84 of the support wall 69. The slide plate 82 is arranged at a position corresponding to the notch 19 of the cover plate 18 of the HDD 16. When the HDD 16 is inserted into the recess 25, the slide plate 82 is externally exposed from the bottom case 5 through the notch 19.

Figures 15, 16:
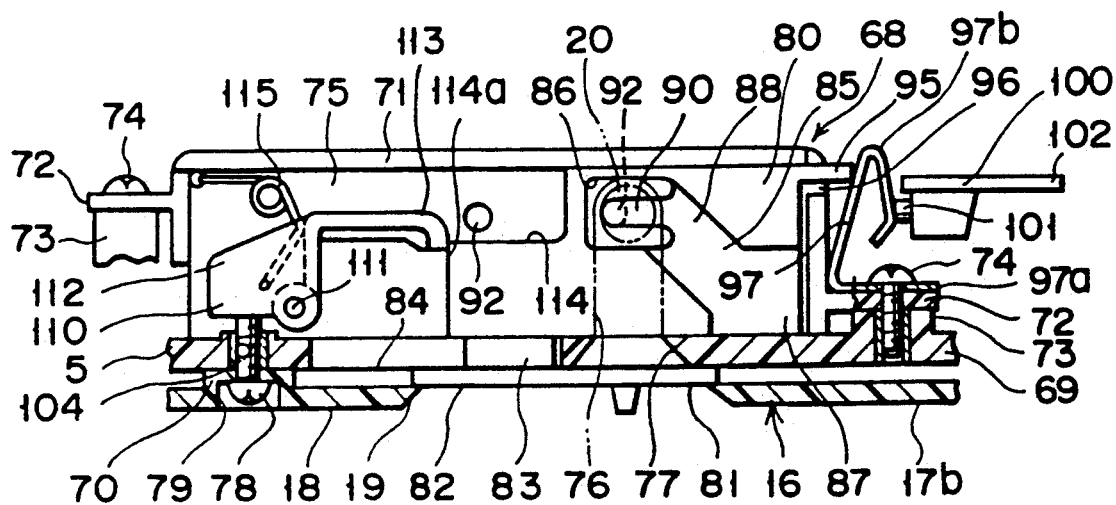
FIG. 15 is a sectional view showing a state wherein a slider of the lock mechanism in FIG. 14 is slid to a lock position at which the storage unit is locked to the receiving portion, and the slider is held at the lock position by a screw for fixing the storage unit to the receiving portion.
FIG. 16 is a sectional view showing a state wherein the slider of the lock mechanism in FIG. 14 is slid to a position between the lock position and a lock release position.
Figure 17:
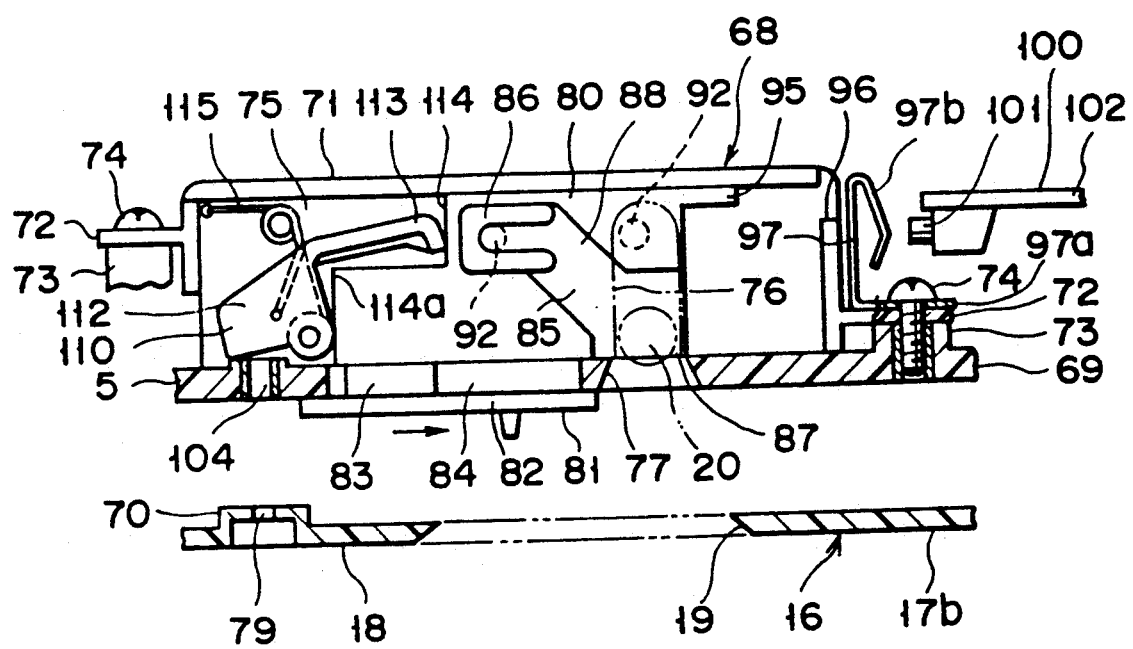
FIG. 17 is a sectional view showing a state wherein the slider of the lock mechanism in FIG. 14 is slid to the lock release position.

A lock groove 85 in which the engaging projection 20 of the HDD 16 is inserted is formed in a surface of the slider 80 which opposes the rear surface 25b of the recess 25. As shown in FIGS. 14 and 15, the lock groove 85 includes a lock portion 86 continuous with an extreme end portion of the insertion port 76 through which the engaging projection 20 passes, an entrance portion 87 continuous with the bottom of the insertion port 76 on the opening 77 side, and an oblique guide portion 88 arranged between the lock portion 86 and the entrance portion 87. The lock groove 85 is bent in the form of a crank as a whole. The entrance portion 87 is continuously open to a surface of the slider 80 which is in slidable contact with the support wall 69 and extends to the opening 77 of the support wall 69. As shown in FIG. 15, therefore, when the slider 80 is slid to the rightmost position, the lock portion 86 of the lock groove 85 is caused to communicate with the insertion port 76. This state corresponds to the lock position of the slider 80. In contrast to this, if the slider 80 is slid to the leftmost position, the entrance portion 87 of the lock groove 85 is caused to communicate with the insertion port 76 and the opening 77, as shown in FIG. 17. This state corresponds to the lock release position of the slider 80.

With this arrangement, if the slider 80 is located at the lock release position, since the entrance portion 87 of the lock groove 85 communicates with the insertion port 76 and the opening 77, the engaging projection 20 of the HDD 16 can be inserted and removed in and from the insertion port 76. In order to hold the HDD 16 in the recess 25, the engaging projection 20 of the HDD 16 is guided into the lock groove 85 through the opening 77 and the insertion port 76. When the slider 80 is slid toward the lock position in this state, the engaging projection 20 is guided into the guide portion 88 of the lock groove 85 and is moved to the extreme end of the insertion port 76, as shown in FIG. 16. When the engaging projection 20 reaches the extreme end of the insertion port 76, the engaging projection 20 is guided to the lock portion 86 of the guide groove 85. As a result, the engaging projection 20 is held at the extreme end of the insertion port 76 so as not to be removed.

The slider 80 includes a lock piece 90 which can be elastically deformed in the direction of thickness of the slider 80. A projection 91 which is brought into slidable contact with the cover 71 is formed on the distal end of the lock piece 90. A pair of positioning holes 92 are formed in the cover 71 with which the projection 91 is in slidable contact. The projection 91 is fitted in one of the positioning holes 92 when the slider 80 is slid to the lock position or the lock release position. When the projection 91 is positioned to one of the positioning holes 92, the projection 91 is fitted in the positioning hole 92 with the elastic force of the lock piece 90. With this fitting operation, when the slider 80 is slid to the lock position or the lock release position, the projection 91 clicks into the corresponding positioning hole 92, and the slider 80 is held at the lock position or the lock release position.

A switch press piece 95 extends from one end of the slider 80. The length of the switch press piece 95 is set such that the switch press piece 95 is housed in the lock chamber 75 when the slider 80 is slid to the lock release position, and extends outward from the lock chamber 75 through a through hole 96 of the cover 71 when the slider 80 is slid to the lock position. As shown in FIGS. 15 to 18, an L-shaped leaf spring 97 is arranged at one end of the cover 71 having the through hole 96. The leaf spring 97 comprises a fixed piece 97a fixed to the tongue 72 of the cover 71 by the screw 74, and a movable piece 97b vertically bent from the fixed piece 97a. The movable piece 97b of the leaf spring 97 is arranged to oppose the through hole 96. When the movable piece 97b of the leaf spring 97 is pressed by the switch press piece 95 of the slider 80, it is displaced.

A normally open switch 100 which is turned on and off by the movable piece 97b is arranged at a position opposite to the movable piece 97b of the leaf spring 97. The switch 100 comprises an actuator 101 to be pressed by the movable piece 97b of the leaf spring 97, and a base board 102 for supporting the actuator 101. The base board 102 is supported by the bottom case 5 of the base unit 2 through a screw 103. The switch 100 is electrically connected to a power source circuit of the printed circuit board 4 by the base board 102. With this arrangement, when the slider 80 is slid to the lock position, and the movable piece 97b of the leaf spring 97 is pressed by the switch press piece 95 of the slider 80, the movable piece 97b is deformed to press the actuator 101 of the switch 100, as shown in FIG. 4. Upon this pressing action, the switch 100 is turned on to allow supply of a current to the HDD 16 through the first connector 24 and second connector 31.

As shown in FIG. 17, when the slider 80 is slid to the lock release position, the pressed state of the movable piece 97b of the leaf spring 97 which is caused by the switch press piece 95 is released. As a result, the movable piece 97b of the leaf spring 97 is restored by its own elastic force in a direction to be separated from the actuator 101. Upon restoration of the movable piece 97b, the switch 100 is turned off to disconnect the current supply to the HDD 16.

In addition, the HDD 16 locked in the recess 25 by the lock mechanism 68 is fixed to the recess 25 by the screw 78. The screw 78 is screwed into a screw hole 104 of the support wall 69 through the through hole 79 of the cover plate 18 of the HDD 16. As a result, the HDD 16 is fixed to the recess 25 while removal of the HDD 16 is prevented. As shown in FIG. 15, one screw hole 104 of the support wall 69 is open to the lock chamber 75. For this reason, while the HDD 16 is fixed by the screw 78, the distal end of the screw 78 extends into the lock chamber 75.

As shown in FIGS. 14 to 17, a lock member 110 for holding the slider 80 at the lock position is housed in the lock chamber 75. The lock member 110 is arranged at a position opposite to the switch 100. The lock member 110 comprises a base portion 112 pivotally supported on the cover 71 by a pivot shaft 111, and a lock arm 113 extending from the base portion 112 to the slider 80. An engaging recess 114 is formed in a corner portion of the slider 80 which opposes the lock arm 113. The lock arm 113 of the lock member 110 is inserted in the engaging recess 114 when the slider 80 is slid to the lock release position. As shown in FIG. 16, the lock member 110 is biased by a torsion coil spring 115 so as to pivot counterclockwise. Upon pivoting of this lock member 110, the distal end of the lock arm 113 opposes the engaging recess 114, and engagement of the lock arm 113 with the slider 80 is avoided. The base portion 112 of the lock member 110 is located on the extension of the screw hole 104 open to the lock chamber 75. As shown in FIG. 15, when the screw 78 for fixing the HDD 16 is screwed into the screw hole 104, the distal end of the screw 78 is brought into contact with the base portion 112 of the lock member 110. Upon this contact, the lock member 110 is forcibly pivoted clockwise against the biasing force of the torsion coil spring 115. Therefore, while the slider 80 is at the lock position, the distal end of the lock arm 113 of the lock member 110 is hooked on a corner portion 114a of the engaging recess 114, and the slider 80 is held not to be moved from the lock position.

A procedure for mounting the HDD 16 in the base unit 2 of the portable computer 1 will be described below.

Figure 21:
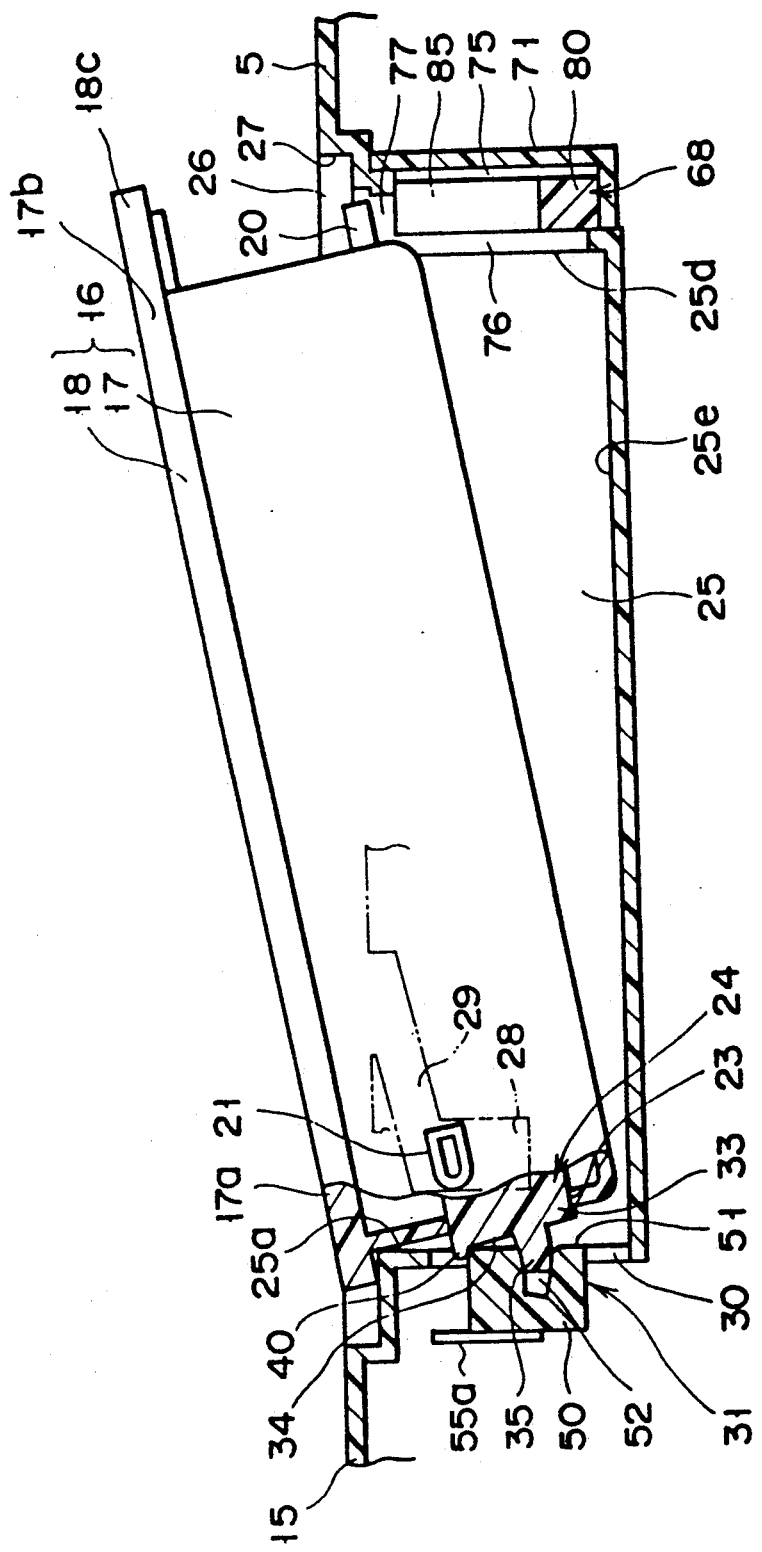
FIG. 21 is a sectional view showing a state wherein the storage unit in FIG. 2 is inserted in the receiving portion of the base unit, and the first and second connectors are brought into contact with each other.

The base unit 2 is turned over to expose the recess 25 of the base unit 2. In this state, as shown in FIG. 21, the guide projections 21 of the HDD 16 are inserted in the guide grooves 28 while the case 17 of the HDD 16 is tilted along the inclined portions 29 of the guide grooves 28 of the recess 25. The HDD 16 is then inserted in the recess 25 of the base unit 2 in an inclined posture, so that the front portion 17a of the case 17 enters the recess 25. When the guide projections 21 reach the distal ends of the guide grooves 28, the guide wall 40 of the first connector 24 is brought into contact with the upper surface of the fitting projection 57 of the second connector 31, and the fitting holes 42 of the guide wall 40 are fitted on the positioning projections 59 of the first fitting projection 57. At the same time, the guide projections 35 of the first connector 24 are inserted in the engaging holes 52 of the second connector 31, and the fitting projections 57 and 58 of the second connector 31 are fitted in the fitting grooves 41 and 44 of the first connector 24. At this time, the hook pieces 22 of the case 17 oppose the lock ports 65 of the recess 25.

Figures 24, 25:
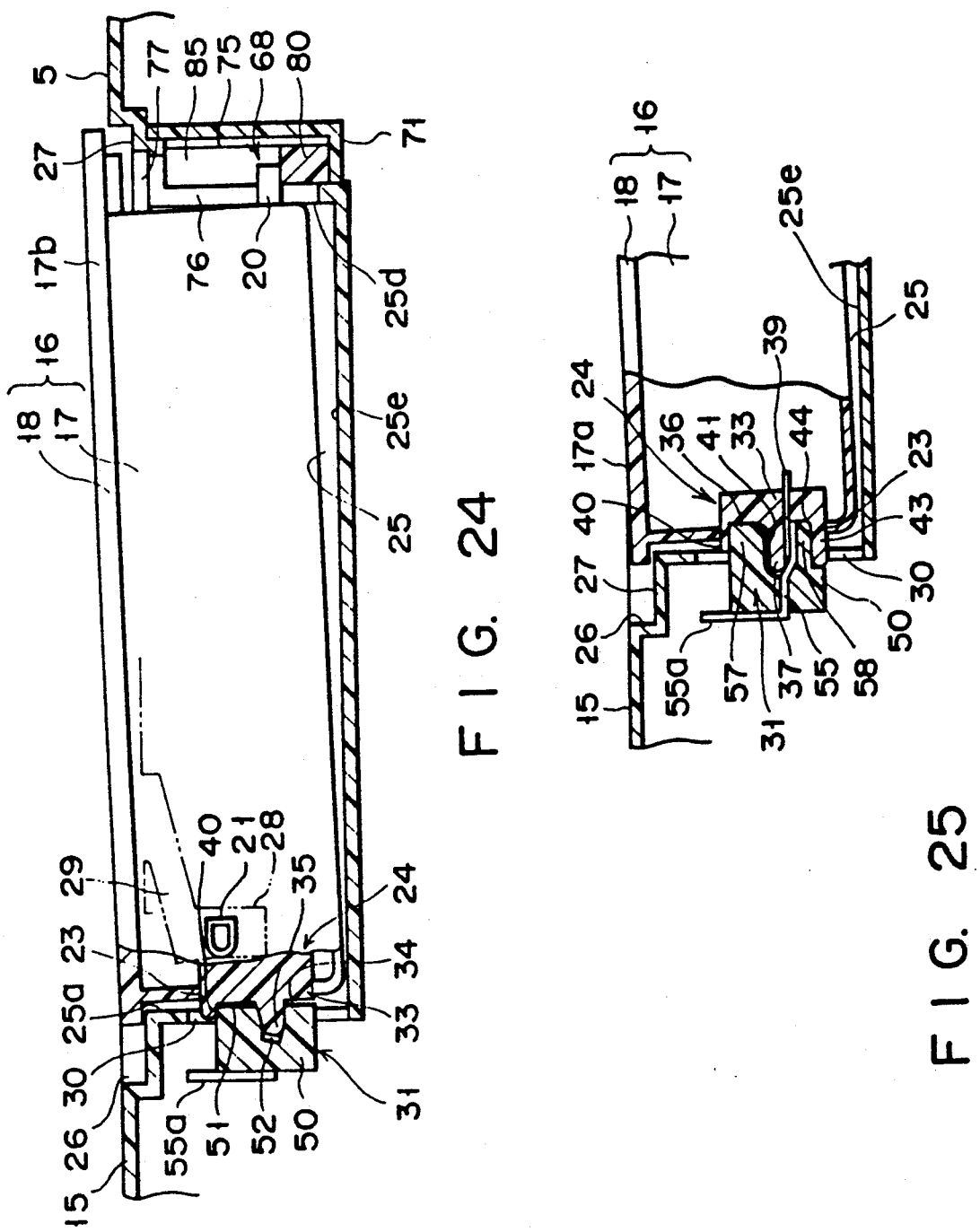
FIG. 24 is a sectional view showing a state wherein the storage unit in FIG. 21 is being housed in the receiving portion of the base unit.
FIG. 25 is a sectional view showing a state wherein the connectors in FIG. 24 are connected to each other, and their connecting terminals are brought into contact with each other.
Figure 26:
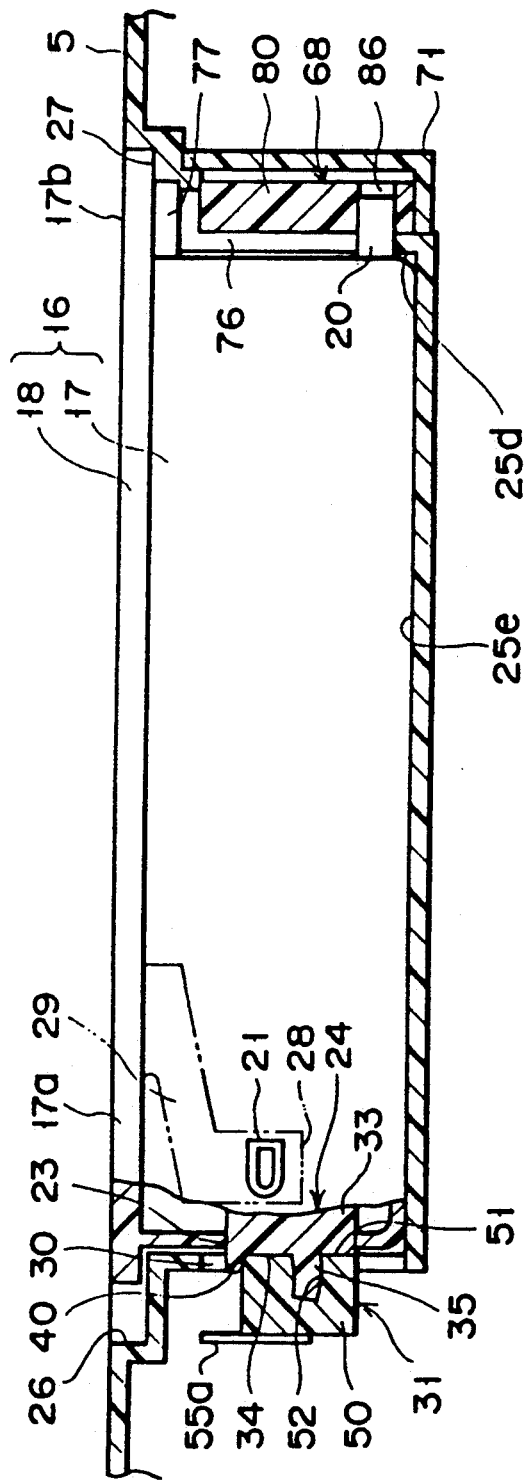
FIG. 26 is a sectional view showing a state wherein the storage unit is completely housed in the receiving portion of the base unit.

When the HDD 16 is further inserted, at the rear portion 17b of the case 17, the engaging projection 20 extending from the rear surface of the case 17 approaches the support wall 69 of the recess 25 and is guided to the opening 77 of the support wall 69. When the rear portion 17b of the case 17 is inserted in the recess 25 in this state, the HDD 16 pivots downward on a contact portion between the first connector 24 and second connector 31. Upon this pivoting of the HDD 16, the guide projections 35 of the first connector 24 are inserted into deep portions of the engaging holes 52 of the second connector 31, as shown in FIGS. 24 and 25. At the same time, the fitting projections 57 and 58 of the second connector 31 are inserted into deep portions of the fitting grooves 41 and 44 of the first connector 24. As a result, the distal end of the first connecting terminals 39 of the first connector 24 vertically overlaps the movable contact piece 56 of a corresponding one of the second connecting terminals 55 of the second connector 31, and these connecting terminals 39 and 55 are brought into slidable contact with each other. In addition, as shown in FIG. 24, as the HDD 16 pivots, the engaging projection 20 of the case 17 is guided from the opening 77 of the support wall 69 to the insertion port 76, and the rear portion 17b of the case 17 enters the recess 25. In this case, as shown in FIG. 17, the slider 80 of the lock mechanism 68 for locking the HDD 16 is slid to the lock release position, and the entrance portion 87 of the lock groove 85 of the slider 80 is caused to communicate with the insertion port 76. For this reason, the HDD 16 pivots until the engaging projection 20 of the case 17 is brought into contact with the inner surface of the entrance portion 87 of the lock groove 85.

When the engaging projection 20 of the case 17 is brought into contact with the inner surface of the entrance portion 87 of the lock groove 85, the slide plate 82 of the operation knob 81 is urged in a direction indicated by an arrow in FIG. 17 to slide the slider 80 from the lock release position to the lock position. As a result, the engaging projection 20 of the HDD 16 is guided by the guide portion 88 of the lock groove 85 to be moved toward the extreme end of the insertion port 76. The engaging projection 20 is guided to the lock portion 86 of the lock groove 85 and is held at the extreme end of the insertion port 76. Upon movement of the engaging projection 20, pivoting of the HDD 16 is resumed, and insertion of the guide projections 35 into the engaging holes 52 and of the fitting projections 57 and 58 into the fitting grooves 41 and 44 is continuously performed. In addition, upon pivoting of the HDD 16, the hook pieces 22 of the case 17 enter the lock ports 65 of the recess 25.

When the engaging projection 20 of the case 17 reaches the extreme end of the insertion port 76, the case 17 of the HDD 16 is completely fitted in the recess 25. As a result, the cover plate 18 of the case 17 becomes continuous with the bottom plate 15 of the bottom case 5 so that the insertion opening 26 of the recess 25 is covered with cover plate 18. In addition, when pivoting of the HDD 16 is resumed, the abutment surfaces 34 of the first connector 24 and the abutment surfaces 51 of the second connector 31 are brought into contact with each other. While the abutment surfaces 34 and 51 of these connectors 24 and 31 are in contact with each other, the positioning projections 59 of the second connector 31 are respectively fitted in the fitting holes 42 of the first connector 24. At the same time, the fitting projections 57 and 58 of the second connector 31 are completely fitted in the fitting grooves 41 and 44 of the first connector 24. Upon this fitting operation, removal of the first connector 24 and second connector 31 is prevented. In addition, the connecting terminals 39 and 55 of the connectors 24 and 31 overlap each other so that the printed circuit board 4 and the HDD 16 are electrically connected to each other.

When the slider 80 is slid to the lock position, the switch press piece 95 protrudes from the through hole 96 of the cover 71 to press the movable piece 97b of the leaf spring 97. The movable piece 97b is then deformed to press the actuator 101 of the switch 100. As a result, the switch 100 is turned on to allow current supply to the HDD 16.

Subsequently, as shown in FIG. 15, the screw 78 is inserted in the through hole 79 of the cover plate 18 of the HDD 16. When this screw 78 is screwed into the screw hole 104 of the support wall 69, the rear portion 17b of the case 17 of the HDD 16 is fixed to the recess 25. Since one screw hole 104 is open to the lock chamber 75, the distal end of the screw 78 is brought into contact with the base portion 112 of the lock member 110. The screw 78 forcibly pivots the lock member 110 clockwise against the force of the torsion coil spring 115. Upon pivoting of this lock member 110, the distal end of the lock arm 113 is hooked on the corner portion 114a of the engaging recess 114 of the slider 80 so that the slider 80 is held not to be moved from the lock position.

According to such an arrangement, while the first connector 24 of the HDD 16 is coupled to the second connector 31 in the recess 25, the abutment surfaces 34 and 51 of the two connectors 24 and 31 are in contact with each other and the guide projections 35 are inserted in the engaging holes 52. Since these guide projections 35 and engaging holes 52 are curved in an arcuated shape, even if an external force is applied to the first and second connectors 24 and 31 in a connecting state so as to disconnect them from each other in a straight direction, the guide projections 35 cannot be pulled off from the engaging holes 52. That is, the guide projections 35 and the guide holes 52 serve as stops for preventing disconnection of the fitting grooves 41 and 44 of the first connector 24 from the fitting projections 57 and 58 of the second connector 31 against an external force acting to disconnect the two connectors 24 and 31 in a straight direction. Therefore, unlike the conventional connectors, the two connectors 24 and 31 need not be firmly engaged with each other, and connection and disconnection of these connectors 24 and 31 can be smoothly performed.

The first connector 24 is connected to the second connector 31 by pivoting the first connector 24 on the contact portion which is brought into contact with the second connector 31. For this reason, the HDD 16 is mounted in the base unit 2 in such a manner that the front portion 17a of the case 17 is obliquely inserted in the recess 25 of the base unit 2, and the case 17 is pivoted to push the rear portion 17b of the case 17 into the recess 25. With this arrangement, no space allowing the HDD 16 to slide is required between the HDD 16 and the recess 25. Therefore, the recess 25 may be formed to have a size corresponding to the case 17 of the HDD 16. This allows a reduction in mounting space for the HDD 16.

In addition, since the connecting terminals 39 and 55 of the first connector 24 and of the second connector 31 overlap each other in a vertical direction perpendicular to the arrangement direction of the connecting terminals 39 and 55, the intervals of the connecting terminals 39 and 55 can be decreased. Therefore, the total lengths of the connector bodies 33 and 50 can be decreased. Hence, a compact connector device can be realized.

The connector device of the present invention is not limited to a lap-top type portable computer and can be equally applied to a wordprocessor.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A connector device comprising:
a first connector having a large number of first connecting terminals; and
a second connector having a large number of second connecting terminals to be brought into contact with the first connecting terminals of said first connector,
said first connector having a contact portion which is brought into contact with said second connector when said first connector is obliquely inserted in said second connector, said first connector being pivoted on said contact portion to be brought into contact with said second connector, and said first connector having a first fitting portion and an arcuated first guide portion on a surface thereof opposite to said second connector,
said second connector having a second fitting portion which is detachably fitted in said first fitting portion when said first connector is pivoted toward said second connector, and an arcuated second guide portion which is engaged with said first guide portion to guide pivoting of said first connector, and
said first connecting terminals of said first connector slidably overlapping said second connecting terminals of said second connector so as to be electrically connected thereto when said first connector is pivoted toward said second connector.

2. A device according to claim 1, wherein said first connector and said second connector respectively include elongated connector bodies for supporting said first connecting terminals and said second connecting terminals, a pair of flat abutment surfaces are respectively formed on each of said connector bodies of said first and second connectors, said flat abutment surfaces being brought into contact with each other when said first connector is pivoted toward said second connector, and said first and second connecting terminals are arranged in a row between said abutment surfaces.

3. A device according to claim 2, wherein a first guide portion is formed on said abutment surface of said first connector, and a second guide portion is formed in said abutment surface of said second connector.

4. A device according to claim 3, wherein said first guide portion of said first connector is a guide projection, and said second guide portion of said second connector is a guide hole in which said guide portion is detachably inserted.

5. A device according to claim 2, wherein said first connecting terminals are disposed along a row on said first connector and said second connecting terminals are disposed along a row on said second connector and when said first and second connectors are connected, said first and second connecting terminals overlap each other, extending in a direction perpendicular to said rows.

6. A device according to claim 1, wherein said contact portion of said first connector includes a fitting hole, and said second connector with which said contact portion is brought into contact includes a positioning projection fitted in said fitting hole.

7. A device according to claim 2, wherein said first fitting portion of said first connector is constituted by a terminal support wall protruding from said pair of abutment surfaces, and first and second fitting grooves open throughout a portion between said abutment surfaces, said first connecting terminals are arranged in a row on a lower surface of said terminal support wall, said second fitting portion of said second connector is constituted by a fitting recess in which said terminal support wall is detachably fitted, and first and second fitting projections detachably fitted in said first and second fitting grooves, and said second connecting terminals are arranged in a row on a bottom surface of said fitting recess.

8. A device according to claim 7, wherein a distal end portion of each of said second connecting terminals is bent at an angle so as to be separated from the bottom surface of said fitting recess, said angle being equal to an angle at which said first connector approaches said second connector during mating.

9. A device according to claim 7, wherein when said first and second connectors are connected to each other, said first and second connecting terminals are clamped between said fitting recess of said first connector and said terminal support wall of said second connector.

10. A portable apparatus including a connector device, comprising:
    storage means formed into a unit as a module;
    a base unit having a recess for detachably housing said storage means;
    a reception side connector arranged in said recess of said base unit and having a large number of connecting terminals, said reception side connector including a reception side fitting portion and an arcuated reception side guide portion;
    an insertion side connector arranged on said storage means and having a large number of connecting terminals to be brought into contact with said connecting terminals of said reception side connector, said insertion side connector including a contact portion which is brought into contact with said reception side connector when said insertion side connector is obliquely inserted in said reception side connector, said insertion side connector being caused to abut against said reception side connector when said insertion side connector is pivoted on the contact portion, said insertion side connector including an insertion side fitting portion which is fitted in said reception side fitting portion when said insertion side connector is pivoted toward said reception side connector, and an arcuated insertion side guide portion which is engaged with said reception side guide portion to guide pivoting of said insertion side connector; and
    said connecting terminals of said insertion side connector slidably overlapping said connecting terminals of said reception side connector so as to be electrically connected thereto when said insertion side connector is pivoted toward said reception side connector.

11. A device according to claim 10, wherein said storage means includes a flat box-like case for housing a hard disk, said case is obliquely inserted in said recess of said base unit, and said insertion side connector is arranged on a front portion, as a leading end portion upon insertion, of said case.

12. A device according to claim 11, wherein said recess of said base unit has a size which allows insertion of said case of said storage means therein.

* * * * *